June 3, 1958 W. J. OWEN ET AL 2,837,288
AUTOMOTIVE HEATING, VENTILATING AND DEFROSTING SYSTEM
Filed Dec. 11, 1953 4 Sheets-Sheet 1

INVENTORS
Webster J. Owen &
BY Charles F. Arnold
ATTORNEY

June 3, 1958 W. J. OWEN ET AL 2,837,288
AUTOMOTIVE HEATING, VENTILATING AND DEFROSTING SYSTEM
Filed Dec. 11, 1953 4 Sheets-Sheet 2

INVENTORS
Webster J. Owen &
BY Charles F. Arnold
ATTORNEY

June 3, 1958 W. J. OWEN ET AL 2,837,288
AUTOMOTIVE HEATING, VENTILATING AND DEFROSTING SYSTEM
Filed Dec. 11, 1953 4 Sheets-Sheet 3

INVENTORS
Webster J. Owen &
BY Charles F. Arnold
C. H. Dibble
ATTORNEY

June 3, 1958     W. J. OWEN ET AL     2,837,288
AUTOMOTIVE HEATING, VENTILATING AND DEFROSTING SYSTEM
Filed Dec. 11, 1953     4 Sheets-Sheet 4
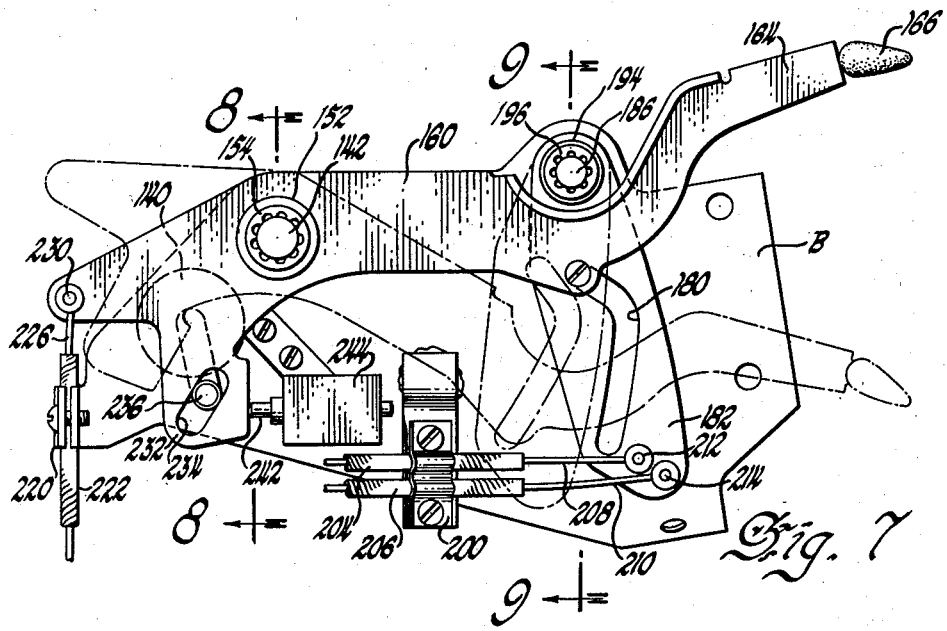
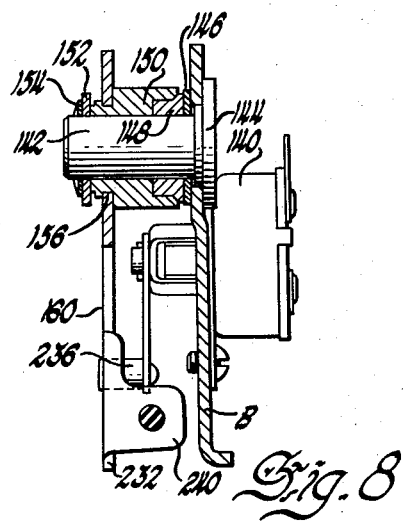
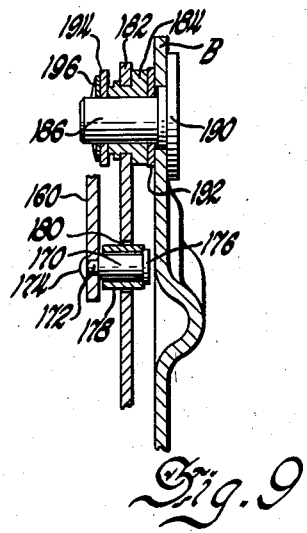
INVENTORS
Webster J. Owen &
BY Charles F. Arnold
C. F. Dibble
ATTORNEY

United States Patent Office 2,837,288
Patented June 3, 1958

2,837,288

AUTOMOTIVE HEATING, VENTILATING AND DEFROSTING SYSTEM

Webster J. Owen, Birmingham, and Charles F. Arnold, Detroit, Mich., assignors to General Motors Corporation, Detroit, Mich., a corporation of Delaware Application December 11, 1953, Serial No. 397,592

7 Claims. (Cl. 237—8)

This invention relates to heating, ventilating and defrosting systems for automotive vehicles and more particularly to systems for the heating and ventilating of passenger compartments in automobiles and including apparatus integrated into the system for defrosting the windshields of such vehicles.

In automotive vehicles it has been found that larger quantities of air for the passenger compartments should and may be admitted as compared with the amounts heretofore considered practical but in attempting to increase the volume and/or velocity of the air entering an automotive ventilating system a number of difficulties have been encountered. The increased air flow carried a proportionately increased amount of moisture. It involved acoustical and air flow control problems and complications were encountered in acquiring the desired placement, degree and/or uniformity in heating effect conducive to passenger comfort and convenience of control for the operator.

It is an object of the present invention to provide an improved automotive heating, ventilating and defrosting system capable of admitting a large volume of air and which will ensure the required heating effect in a passenger compartment and also ease of control from the viewpoint of the operator.

A feature of the invention is a heating, ventilating and defrosting system employing improved controls for integrated operation.

Another feature is a vehicle body blister or duct means for conducting entering air for ventilation in combination with air heater means and suitable controls.

Another feature of the invention is a duct system including spaced ducts or blisters on the engine side of an automotive fire wall in combination with a dual system for heating the passenger compartment of a vehicle and defrosting the windshield of that vehicle and including controls integrated into the system.

In the drawings:

Fig. 7 is an enlarged view in side elevation of a control assembly shown in Fig. 4 showing two positions of the control elements;

Fig. 8 is a sectional view taken along the line 8—8 of Fig. 7; and

Fig. 9 is a sectional view taken along the line 9—9 of Fig. 7.

Figures 1, 2:
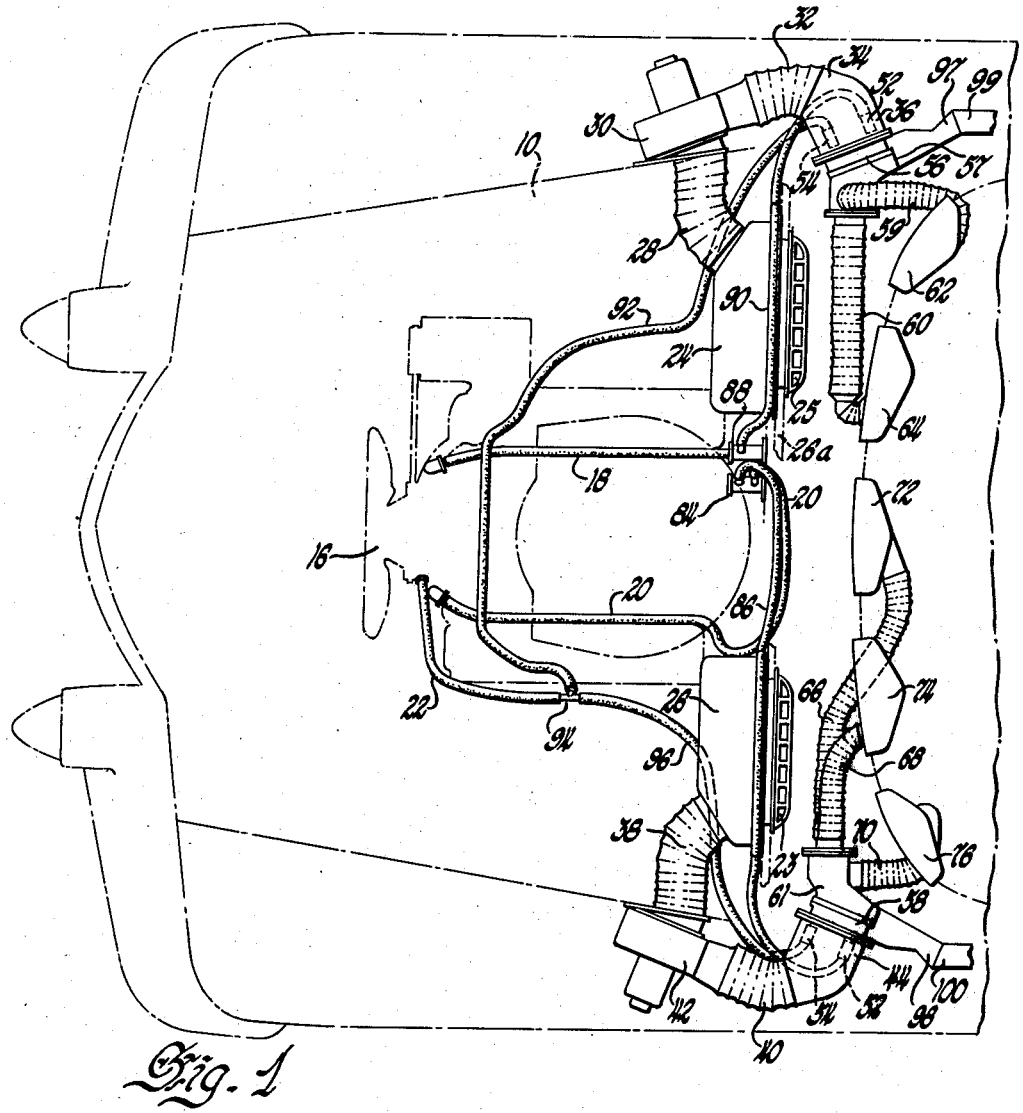
Fig. 1 is a plan view of the front half of an automobile drawn in dot-and-dash lines with the main elements of a heating and defrosting system arrangement embodying the present invention being shown in full lines and as installed on the vehicle.
Fig. 2 is a plan view of a door duct, part of which is shown in Fig. 1.

A heating, ventilating and defrosting system in which the present invention is embodied is shown in the drawings as installed on an automobile 10 which is provided with a windshield 12 and an air inlet 14 passing through the cowl thereof. The inlet 14 is located adjacent the base of the windshield 12 and extends across substantially the full width of the cowl. The automobile 10 is provided with a power plant 16 from which hot water may be drawn through two hose connections 18 and 20 by pumping means, not shown, and circulated through the cores of heaters 36 and 44. After passing through the heaters 36 and 44, the water is returned to the cooling system of the power plant 16 by means of a hose system terminating with a hose connection 22.

Figure 3:
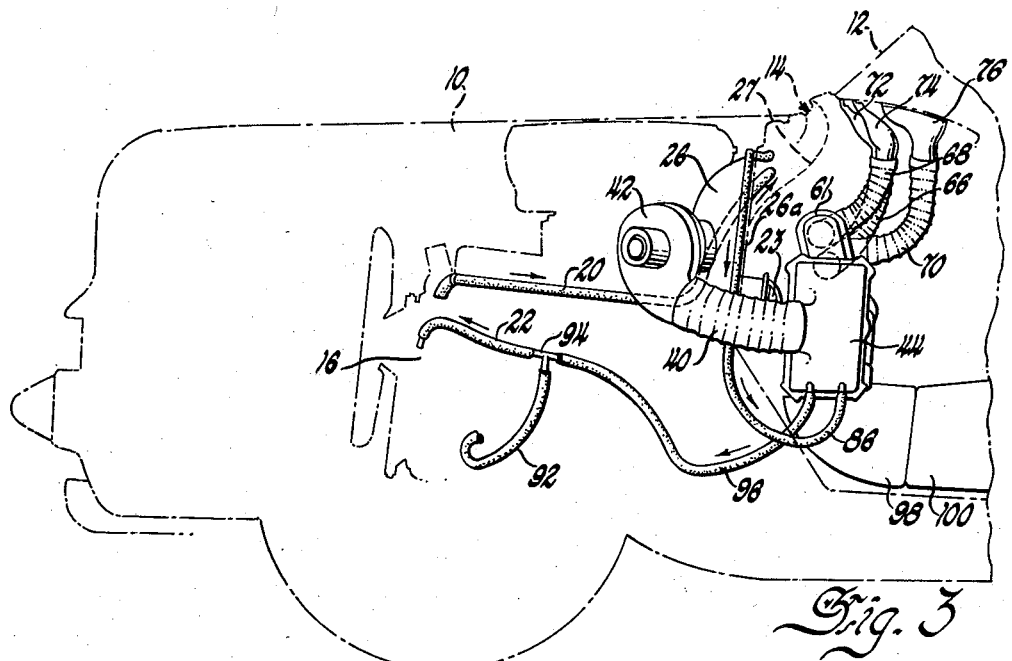
Fig. 3 is a view in side elevation of the assembly shown in Fig. 1.

The vehicle 10 is provided with a duct system including two smoothly contoured S-shaped ducts 24 and 26. These ducts are spaced apart on the engine side of the fire wall 26a of the vehicle but they communicate at their upper portions by means of a horizontal duct, the rear curved wall 27 of which being shown in Fig. 3 by a curved dotted line. Each duct 24 or 26 includes a blister portion mounted on the engine side of the fire wall, the duct being of S-shaped construction when considered in vertical section. It will be understood that air entering at the inlet or wide air scoop 14 is caused to flow downwardly in an S-curve path and through each of the blisters from whence the air, for ventilation purposes, may pass directly into the passenger compartment of the vehicle through grill outlets 23 and 25 controlled by suitably operated valves not shown in the drawings.

Air may be taken from the blisters and forced by means of blowers or fans to heating and defrosting outlets and in the present instance the blister 24 is provided with an outlet conduit 28 leading to the inlet side of a fan 30, the outlet side of which being connected by means of a flexible conduit 32 to the inlet portion 34 of the right-hand heater unit 36. The left-hand blister 26 is also provided with flexible conduits 38 and 40 and a fan 42 arranged to supply air to the heater 44 mounted on the left-hand side of the vehicle cowl.

A system employing generally similar duct construction is shown and claimed in the pending application Serial Number 392,806 filed November 18, 1953 in the names of James D. Leslie and Robert M. Fox and entitled Vehicle Body With Built-In Ventilation System, now Patent No. 2,807,201.

The heaters 36 and 44 are similar in construction except for being made to the opposite hand. It will be understood that each heater has a core 50 such as diagrammatically shown in connection with the heater 36 in Fig. 6. The core 50 is conventionally provided with a hot water inlet connection 52 and a water outlet connection 54 for circulation of water therethrough.

Each heater 36 or 44 is provided with a distribution chamber 56 or 58. These two chambers are to the opposite hand but are otherwise similar in construction. The chamber 56 is joined to the air discharge side of the heater 36 in order to receive air therefrom and it is provided with a manifold 57 having two connections 59 and 60 leading to two defroster nozzles 62 and 64, respectively. The chamber 58 is provided with a manifold 61 having three outlet connections 66, 68 and 70 which serve to guide air to three windshield defrosting nozzles, 72, 74 and 76 respectively. It will be understood that each of the defrosting nozzles 62, 64, 72, 74 and 76 is so placed as to direct air upwardly for impingement against the inner or rearward side of the windshield 12 and that the number of these nozzles may be varied. Valve structure within the chambers 56 and 58 are described hereinafter in connection with the controls for the system.

Two thermostatic control valves 78 and 80 (Fig. 4) are mounted on the passenger compartment side of the fire wall 26a. These valves are conventional and equivalent valves may be used. Each valve may be set to secure a required water flow through a heater to effect the proper degree of heating of air passed through the heater core. The valve 78 has a cylindrical portion 84 (Fig. 1) extending through the fire wall 26a and to this portion is connected the discharge end of the hose connection 20 and the inlet end of a hose connection 86, the latter leading to the heater 44. The thermostatic valve 80 (Fig. 4) has a cylindrical portion 88 (Fig. 1) to which water is led by means of the hose 18. The water is discharged therefrom by a second hose 90 which is connected to the heater 36 by way of the latter's connection 52. Water discharging from the heater 36 enters one end of a hose 92 the other end of which being connected to the adjacent ends of the hose 22 and 96 by means of a T connection 94. The heater 44 is arranged to discharge through the hose 96 to the T connection 94.

Figure 6:
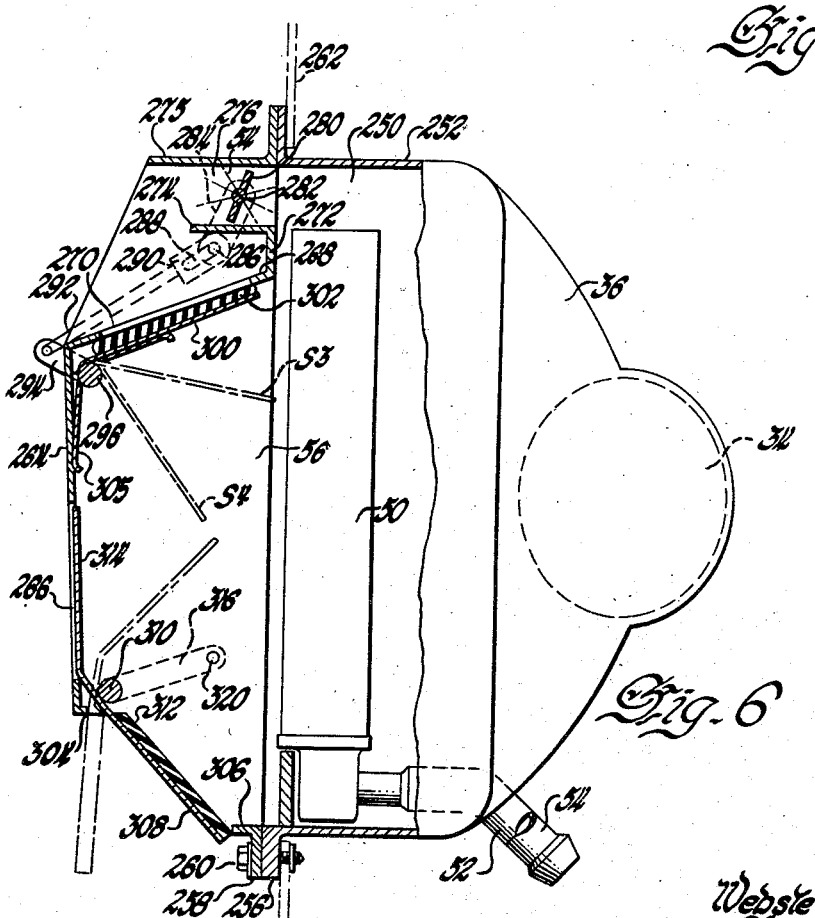
Fig. 6 is an enlarged side view, partially in section, of one of the heaters shown in Fig. 4.

Right angle ducts 97 and 98 (Fig. 1) are attached to the lower ends of the chambers 56 and 58, respectively. These are for the purpose of supplying air to door ducts 99 and 100, respectively, of the vehicle. The arrangement is such that the open ends of ducts 97 and 99 abut and intercommunicate when the right-hand door leading to the passenger compartment is closed. The ducts 98 and 100 are similarly arranged to abut when the left-hand vehicle door is closed. The vehicle doors are not shown in the drawings but the duct system of each door is similar and is shown in Fig. 2 as installed in the left-hand door. The duct 100 is provided with a right angle fitting or elbow 101 which communicates with an elbow 102 by means of a flexible conduit 103. The elements 100, 101, 102 and 103 are built into the door and are arranged to discharge air near the rear and low portion of the door and into the passenger compartment. These door ducts are optional equipment and need not be employed if an underseat heater is used or if the type of vehicle does not necessitate their presence. In the latter case each heater may be arranged to discharge directly into the passenger compartment as is shown in Fig. 6—i. e.—directly from each heater without passing into a right angle duct 97 or 98.

Figure 4:
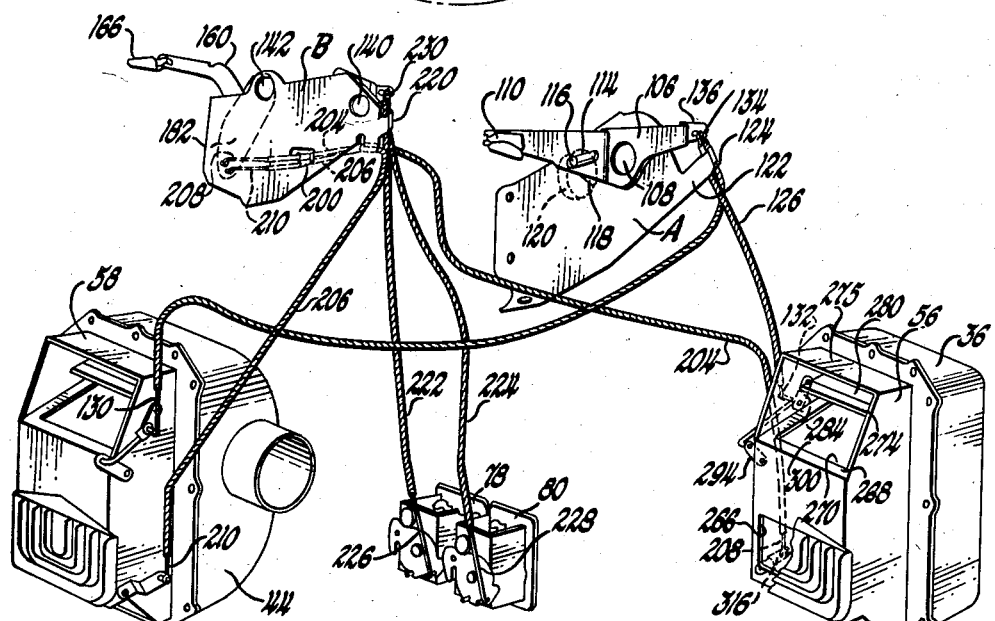
Fig. 4 is an enlarged perspective view of the heaters shown in Fig. 1 with the angular position of the heaters changed for clarity of illustration and the addition of controls which integrate the system, the connections to door ducts and defroster nozzles being omitted.

Concealed from view within the passenger compartment of the vehicle 10 and fastened to the instrument panel 104 (Fig. 5) are two sheet metal brackets A and B (Fig. 4). Each bracket is arranged vertically and is rigidly attached to the concealed side of the instrument panel 104 by means not shown in the drawings.

The bracket A bears a control lever 106 which is pivoted to the bracket by means of a pin 108. The rearmost end 110 of the lever 106 is so formed as to provide a finger piece or knob to facilitate handling and it extended through a slot 112 (Fig. 5) of the panel 104. Near the pin 108 a slot 114 is formed in the lever 106 and through this slot is extended a crank pin 116 which is fixed to the end of a switch lever 118. The latter is in turn joined to the shaft of a switch 120 affixed to the other side of the bracket A. This switch 120 is arranged to control the motors of both fans 30 and 42.

The forward end of the bracket A is provided with an extending portion 122 which serves as a clamping means to hold the ends of two flexible conduits or sheaths 124 and 126. The conduit 124 serves to guide a Bowden wire 130 which leads to the heater 44. The conduit 126 guides a Bowden wire 132 which leads to the heater 36. A pin 134 extends from the foremost end 136 of the lever 106 and to this pin the upper ends of the Bowden wires 130 and 132 are pivotally attached.

The bracket B has affixed thereto a switch 140 which is connected in parallel with the switch 120 to control the fans 30 and 42.

A pivot pin 142 is fastened to the bracket B and is provided with a two-shouldered head 144 which accurately holds the pin in position as seen in Fig. 8. To aid in holding the pin axially for providing a bearing surface, a washer 146 and two axially aligned cylindrical members 148 and 150 are employed in combination with a washer 152 and a spring washer 154. A control lever 160 is rigidly secured in a recess 156 in member 150 for rotation with the latter. One end 164 of the lever 160 extends rearwardly and through a slot 162 in the instrument panel 104, and this end is provided with a suitable finger piece 166. Approximately midway between the pin 142 and the finger piece 166, lever 160 has located thereon a pivot pin 170 having a reduced portion 172. The reduced portion passes through an opening in the lever 160 as shown in Fig. 9. This reduced portion is upset to form a head 174 for holding the pin 170 rigidly on the lever 160. The other end of the pin 170 is provided with a head 176 which retains a roller 178 on the pin for engagement with the sides of a cam slot 180 formed in a cam lever 182. The upper end of lever 182 is joined to a cylindrical member 184 which is held to the bracket B by means of a pin 186 having a two-shouldered head 190 and suitable washers 192, 194 and 196. The lever 182 and the member 184 are adapted to rotate together on the pin 186.

A clamping means 200 (Fig. 7) is attached to a midportion of the bracket B and serves rigidly to hold in position the adjacent ends of two conduits 204 and 206. These conduits guide two Bowden wires 208 and 210, respectively, which are pivotally connected to pins 212 and 214 affixed to the depending end of the cam lever 182. The other end of the Bowden wire 208 extends to the heater 36 and the other end of the Bowden wire 210 extends to the heater 44.

At the foremost end of the bracket B is a clamping means 220 arranged to hold the adjacent ends of two conduits 222 and 224 in fixed positions. These conduits serve to guide two Bowden wires 226 and 228, respectively, and one end of each of these wires is pivotally connected to a pin 230 passed through the foremost end of the lever 160. The other end of the wire 226 is operatively connected to the thermostatic valve 78 and the other end of the Bowden wire 228 is connected to the thermostatic valve element 80.

Depending from the lever 160 midway between the pins 142 and 230, is an arm 232 in which a slot 234 is formed. The sides of this slot are so placed as to engage the crank pin 236 of the switch 140.

One edge of the depending arm 232 is bent to form a flange 240 (Fig. 8) and this flange is so positioned as to engage a plunger 242 of a switch member 244. This switch member 244 may or may not be included in the assembly but may be utilized in the event that an underseat heater is employed and to control a fan for such a heater.

As the heaters 36 and 44 are very similar except for being made to the opposite hand, a detailed description of the heater 36 only will suffice. The heater core is depicted diagrammatically in Fig. 6 as previously stated and it is so mounted in the casing of the heater that a clearance space 250 is left at the top of the core whereby air may bypass the latter. The heater 36 is made in two portions comprising an air receiving housing 252 and the rearwardly directed housing or distribution chamber 56 which are joined together by means of suitable flanges 256 and 258. Bolts 260 are utilized to hold the two parts of the heater housing together and in mounted relation to the side portion 262 of the vehicle cowl. The chamber 56 of the heater is box-like in configuration and is provided with a vertical wall 264 with a rectangular opening 266 in its lower half. Joined to the upper edge of the wall 264 and inclined upwardly towards the housing portion 252 is a wall 268 having a rectangular port 270 therein. The upper edge of this wall 268 is joined to a vertical portion 272 and to a rearwardly extending horizontal shelf-like portion 274. The portion 274 cooperates with the top wall 275 of the casing of chamber 56 to define a horizontal passage 276 controlled by a defogging valve 280 which is fixed to a shaft 282 pivoted in the walls of the casing. One end of the shaft 282 has affixed thereto a crank member 284 and this member carries a pin 286 which is engaged with the walls of a slot 288 formed in a member 290 joined to one end of a rod 292. The other end of the rod 292 is pivoted to one end of a crank lever 294 secured to one end of a shaft 296 journaled in the side walls of the chamber 56. The shaft 296 is arranged to operate a valve member 300, one side of which is provided with a pad 302 of yieldable material such as felt or rubber. The pad 302 is of such size as to overlap or cover the opening 270 when the valve 300 is in closed position. A spring member 305 mounted on shaft 296 has arms which bear against the casing and valve 300 as constantly to tend to close the valve.

The bottom of the chamber 56 is provided with two horizontally extending flanges 304 and 306 and the opening between these two flanges is adapted to communicate with the duct 97. A valve member 308 secured to a shaft 310 pivoted in the side walls of the chamber 56 controls the air flow through this opening. A soft felt or rubber pad 312 is caused to adhere to the inner side of the valve 308 to cushion the closing action of the latter. The valve member 308 is provided with an upwardly extending portion 314 which is adapted to control the opening 266 leading directly into the passenger compartment. Rigidly affixed to the shaft 310 outside of the chamber 56 is a crank lever 316. A pin 320 is mounted on the outer end of crank lever 316 and to which one end of the wire 208 is pivotally affixed.

It will be noted that no manifold connection for the defroster nozzles is shown in Fig. 6, but it will be understood that such a manifold 57 (Fig. 1) is easily joined to the casing of chamber 56 for communication with the passage 276 and the opening or port 270 leading from the upper portion of the heater.

If desired, valve member 308 may be arranged in combination with the duct 97 leading through the right-hand door of the vehicle 10 to admit air at a low level and rearwardly into the passenger compartment. Such a door duct 97 is not shown in Fig. 6 of the drawings but it is clear that it may be joined to the chamber 56. The two parts 97 and 99 would come into communication as the right-hand vehicle door is closed as earlier described with reference to the left-hand door as shown in Fig. 2. Without such a duct the air could be directed into the lower front portion of the vehicle passenger compartment as previously stated.

In considering the operation of the system generally, it will be seen that the left-hand lever 160 controls the fans 30 and 42, the lower air valves of the chambers 56 and 58 and the water flow or temperature valves 78 and 80 as well as an underseat heater fan (by switch 244) if such a heater is used. Movement of the left-hand lever 160 serves to operate the two thermostatic valves 78 and 80 by means of the wires 226 and 228. It also operates the lower valves of each of the heaters 36 and 44 by means of the cables 208 and 210.

The cam pin and slot connection 170 and 180 serve to provide an initially large angular or rotative movement for the lower heater valves on slight downward movement of the lever 160. The effective opening of these valves is thereby more easily judged by a given movement of the knob 166. It will be appreciated that each of the lower heater valves such as valves 308 and 314 is so constructed that it serves to open two heated air outlets simultaneously and to the same degree. Because of this arrangement, for each heater heated air simultaneously may be directed horizontally into the passenger compartment and through the openings leading to the door ducts 99 and 100.

The fans 30 and 42 are so connected in parallel in the electrical system of the vehicle that they are controlled by either of the switches 120 and 140 during movement of the levers 106 or 160 as heretofore stated. Lowering of either lever will close the circuit and start the fan motors.

It will also be seen that the right-hand lever 106 constitutes part of a single means which controls the fans 30 and 42, the two defogging valves (such as valve 280) and the defroster valves (such as valve 300), as associated with both heaters 36 and 44.

Figure 5:
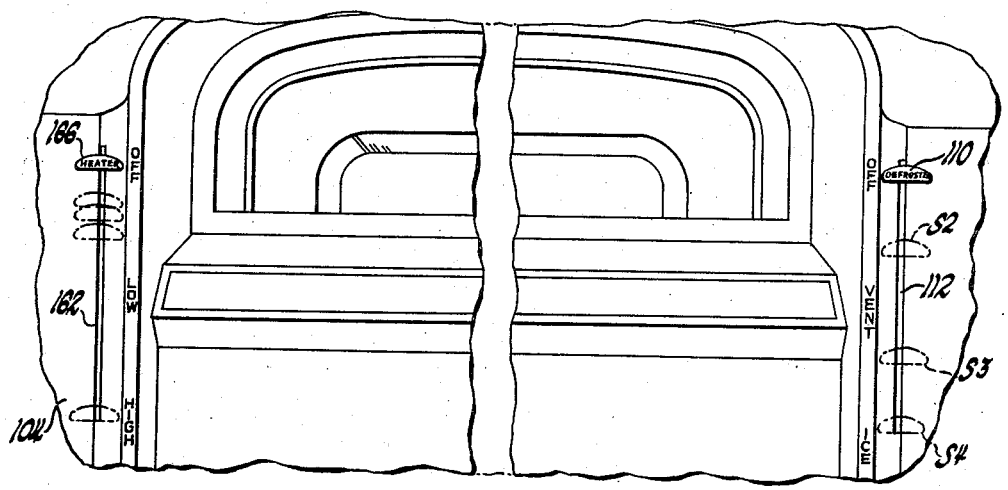
Fig. 5 is an enlarged elevational view of a portion of the instrument panel facing the passenger compartment of the vehicle showing a portion of the controls shown in Fig. 4.

During weather conditions requiring defogging or deicing of the windshield 12, the right-hand lever 106 is utilized. Fig. 5 shows the knob 110 in full lines in the "off" position and Fig. 6 shows the defogging valve 280 and the defrosting valve 300 in full lines in the corresponding closed positions. This condition obtains in both heaters with appropriate setting of the single control means.

Assuming that merely a defogging action is required, the knob 110 may be depressed downwardly within a range terminating at $S^2$ (Fig. 5) without moving the defroster valve 300 from its closed position wherein it is held by the spring 305. The pin 286 and slot 288 arrangement permits this action. Unheated air is then forced over the core 50 and through the defroster nozzles for impingement against the windshield to remove condensed moisture or "fog" from the interior side thereof. Both heaters function together in this operation.

Further depression of the knob 110 to within the range from $S^2$ to $S^3$ (Fig. 5) results in a gradual opening of the defroster valve 300 and the gradual closing of the defogging valve 280. This intermediate range for the knob 110 is satisfactory for the usual conditions requiring some windshield clearing action. Again the valving is such that the heaters operate in concert.

In the event that the windshield is coated with ice or snow and a strong heating effect is desired, the knob 110 is still further depressed into the range between positions $S^3$ to $S^4$ (Fig. 5). In this range the defogging valve 280 is closed and the defrosting valve is open and all air admitted to the defroster nozzles from both heaters is passed through the heated cores and effectively thaws any snow and ice on the windshield in a short interval of time.

We claim:

1. A heating, ventilating and defrosting system for an automobile having a cowl, fire wall and windshield, said system comprising a heater and a distribution chamber at each side of said cowl, an air inlet at the top of said cowl, two blisters supported on the engine side of said fire wall, a blower located forward of each of said blisters, each of the latter with one of said blowers being arranged to conduct air from said air inlet through one of said heaters to one of said chambers, separate defroster means connected to each chamber and directed at said windshield, and valve means associated with each of said chambers for controlling the defroster means whereby air from the said blisters may bypass or pass through the cores of the heaters.

2. A heating, ventilating and defrosting system for an automobile having a cowl, fire wall and windshield, said system comprising a heater at each side of said cowl, an air inlet at the top of said cowl, two blisters supported on the said fire wall, blower means associated with each of said blisters and being arranged to cooperate therewith to conduct air from said air inlet and rearwardly to one of said heaters, separate defroster means connected to each heater and arranged to impinge air against said windshield, air outlets at two levels leading from each of said heaters, valves controlling air flow through said air outlets, thermostatic valves controlling the temperature of said heaters, and a single means for controlling said thermostatic valves and the said air flow control valves.

3. A heating, ventilating and defrosting system for an automobile having a cowl, fire wall and windshield, said system comprising a heater at each side of said cowl, an air inlet at the top of said cowl, two blisters supported on the said fire wall, each of said blisters having duct means arranged to conduct air forwardly therefrom and then rearwardly to one of said heaters, separate defroster means connected to each heater and directed at said windshield, thermostatic means for controlling the temperature of each heater, air outlets at different levels leading from each heater, and valves for regulating air flow through said defroster means and said air outlets, and a single control means for said valves.

4. A heating, ventilating and defrosting system for an automobile, having a cowl, fire wall and windshield, said system comprising a heater at each side of said cowl to the rear of said fire wall, an air inlet at the top of said cowl near the base of said windshield, two spaced blisters supported on the engine side of the said fire wall, two blowers each being connected to one of said blisters and one of said heaters whereby air may be forced from said air inlet through said blisters and said heaters, separate defroster means connected to each heater and directed towards said windshield, valves associated with each heater for controlling air discharging therefrom at different levels, a single means for controlling the said defroster means and blowers, and a second single means for controlling said thermostatic and air discharge controlling valves.

5. A heating, ventilating and defrosting system for an automobile having a cowl, fire wall and windshield, said system comprising a heater core and distribution chamber at each side of the said cowl and to the rear of said fire wall, an air inlet extending substantially the full width of said cowl, duct means including two blisters or ducts supported on the engine side of the said fire wall, said means being arranged to conduct air from said inlet forwardly and then rearwardly to said heater cores and chambers, defroster means connected to upper portions of said heaters and chambers and extending to the rear side of said windshield, and valves associated with said heaters and chambers for directing air through or to one side of each of said heater cores whereby heated or unheated air may be directed by the said defroster means against said windshield.

6. A heating, ventilating and defrosting system for an automobile having a cowl, fire wall, windshield and instrument panel, said system comprising an air inlet at the top of said cowl, said air inlet extending substantially the full width of said cowl, duct means including two blisters mounted on the engine side of said fire wall and communicating with said air inlet, a heater at each side of said cowl to the rear of said fire wall, a blower associated with each of said blisters and arranged to conduct air therefrom toward one side of said cowl and then to one of said heaters, defroster nozzles positioned to impinge air against the rearward side of said windshield, conduits connecting said heaters with said nozzles, a distribution chamber with air outlets associated with each heater and communicating with said conduits, one of said outlets for each chamber constituting a passage for defogging or unheated air passing by the corresponding heater core, one other of said outlets for said heater constituting a passage for defrosting or heated air passing through the said core, a valve arranged to control air flow through each of said outlets, and a single control means associated with said instrument panel and operatively connected with said valves for selecting and proportioning either defrosting or defogging air from both chambers for passage through said nozzles.

7. A heating, ventilating and defrosting system for an automobile having a cowl, windshield, instrument panel and fire wall separating an engine compartment from a passenger compartment, said system comprising an air inlet extending substantially the full width of the said cowl and spaced from said windshield, duct means including two blisters mounted on the engine side of said fire wall and communicating with said air inlet, a heater at each side of said cowl, a fan with an inlet connected to each of said blisters, each fan being arranged to conduct air from one of said blisters to one of said heaters, separate defroster nozzles positioned to impinge air against the rearward side of said windshield, defroster conduits connecting said heaters with said nozzles, each of said heaters including a chamber with four air outlets, two of said air outlets communicating with said defroster conduits, one of said two outlets constituting a passage for defogging air passing by the corresponding heater core, the other of said two outlets constituting a passage for defrosting or heated air passing through the said core, the other two air outlets leading into the said passenger compartment, valves arranged to control air flow through the outlets of each of said heaters, a single control means associated with said instrument panel and operatively connected with the valves of both heaters for selecting and proportioning either defrosting or defogging air for passage through said nozzles, a first switch controlling said fans and arranged to be operated by said single control means, valves controlling the temperature of said heaters, a second single control means associated with said instrument panel and operatively connected with the other valves of both heaters and said temperature control valves, and a second switch controlling said fans and arranged to be operated by said second single control means.

References Cited in the file of this patent

UNITED STATES PATENTS

| | | |
|---|---|---|
| 2,372,377 | Hans | Mar. 27, 1945 |
| 2,627,218 | Katz | Feb. 3, 1953 |
| 2,683,025 | Matulaitis | July 6, 1954 |
| 2,707,079 | Little | Apr. 26, 1955 |
| 2,729,158 | Wilfert | Jan. 3, 1956 |